United States Patent [19]

Newburgh

[11] Patent Number: 4,768,572
[45] Date of Patent: Sep. 6, 1988

[54] MECHANICAL DEVICE FOR BREAKING BEADS OF PNEUMATIC TIRES

[76] Inventor: George W. Newburgh, R.R. #2, Stevensville, Ontario, L0S 1S0, Canada

[21] Appl. No.: 55,295

[22] Filed: May 29, 1987

[51] Int. Cl.4 ............................................. B60C 25/06
[52] U.S. Cl. .................................. 157/1.26; 157/1.28
[58] Field of Search ............... 157/1.17, 1.26, 1.28, 157/1.3, 1.1

[56] References Cited

U.S. PATENT DOCUMENTS 2,798,540  7/1957  Branick ............................ 157/1.26
3,857,431 12/1974  Boyle ............................... 157/1.26
3,865,172  2/1975  Branick ............................ 157/1.26
4,655,271  4/1987  Gamery ............................. 157/1.26

Primary Examiner—Debra S. Meislin
Attorney, Agent, or Firm—Berman, Aisenberg & Platt

[57] ABSTRACT

A mechanical device for breaking the beads of pneumatic tires from the rims of vehicles is provided. The device comprises a pair of jaw members, one of which is highly mechanically leveraged to move towards the other jaw member and thereby break the bead of the tire held therebetween. The device is lightweight, portable, operated by hand and comprises a minimum of working parts.

8 Claims, 2 Drawing Sheets

MECHANICAL DEVICE FOR BREAKING BEADS OF PNEUMATIC TIRES

BACKGROUND OF THE INVENTION

The present invention relates to a mechanical device for loosening or breaking beads of pneumatic tires from the rims of the wheels.

It is very difficult to break the beads of pneumatic tires from the rims of wheels, particularly for heavy vehicles such as trucks and trailers, farm tractors and their associated implements, earth movers, aircraft or the like.

In the removal of a tire from a wheel rim, lateral displacement of the tire bead from the indented bead-receiving portion of the rim is required. A section of the bead is laterally displaced by inward movement of that section. After this lateral displacement has taken place, the entire bead may be displaced from the annular depression where it is normally securely seated in operative position on the wheel rim. This lateral displacement of the section of the bead of the tire is known as "breaking the bead".

While the driving of wedge-shaped bead breaking implements between the bead and wheel rim is usually successful to break the bead of a small tire such as tires of automobiles, such a procedure often will not break the bead of a larger tire such as those for farm tractors and heavy equipment. Instead, more sophisticated apparatus, usually in the form of hydraulically-driven wedges or lever arms and the like have conventionally been used to break the beads of such tires and permit their removal from their associated wheel rims. Examples of such devices are illustrated, for example, in Branick U.S. Pat. No. 3,865,172 issued Feb. 11, 1975, Boyle U.S. Pat. No. 3,857,431 issued Dec. 31, 1974 and Branick Canadian Pat. No. 555,821 issued Apr. 15, 1958.

Canadian Pat. No. 856,557 of LePier issued Nov. 24, 1970 describes and illustrates a purely mechanical device for breaking the bead of such a large tire, the device being hand-operated. The device is provided with a clamp so that the device may be firmly clamped onto the wheel rim. Then a displacer element which is threadably connected to a portion of the clamp is rotated and thereby moved towards and into the bead of the tire to displace it and break the bead. For its effective operation, such a device requires it to be firmly gripped to the wheel rim. This requires a preliminary application of a conventional type of starter wedge to be driven by hammer to initially separate a portion of the bead a slight distance from the rim to enable mounting of the device to that rim. As well, because of the force required to clamp the device to the rim to ensure that it does not come loose during the bead breaking operation, distortion of the rim by the clamp may occur.

It is an object of the present invention to provide a hand-operated mechanical device for breaking the beads of pneumatic tires, the device being made up of a minimum of working parts, and which is light in weight and portable and extremely rugged and durable.

It is a further object of the present invention to provide such a device which is capable of generating sufficient power to be used in conjunction with pneumatic tires of large cross-sectional diameters and which may be adjusted so as to be used on tires varying considerably in cross-sectional diameters.

SUMMARY OF THE INVENTION

In accordance with the present invention there is provided a mechanical device for breaking the bead of a pneumatic tire on a wheel rim to facilitate removal of the tire from that rim. The device comprises first and second rigid frame arms pivotably connected at one end to pivot about a point. An elongated screw extends between and is secured to the other ends of the frame arms. The elongated screw is threadably secured to at least one of these ends so that rotation of the screw in one direction causes the corresponding ends of the frame arms to spread and the frame arms to thereby open. Rotation of the screw in the other direction causes these ends of the frame arms to approach each other and the frame arms to thereby close. A first jaw member is rigidly secured to the first frame arm near the end of that frame arm which is pivotally connected to the other frame arm. It is oriented in upstanding fashion in a direction away from the second frame arm. This jaw member has at its free end a jaw face. A lever bar means is pivotably secured at one of its ends to the second frame arm at a point spaced a distance from the pivot point of the two arms. A lever arm forms a second jaw member on which are three points in the form of the apexes of a triangle. The second jaw member is pivotably secured to the first frame arm at a first one of the apexes. This second jaw member is pivotably secured between the two frame arms to the other end of the lever bar means at a second one of the apexes. The third one of the apexes, is located above the first frame or in a direction away from the second frame arm. Secured to the third apex is a jaw face spaced from and facing the jaw face of the first jaw member. The first and second jaw members and associated jaw faces are spaced sufficiently to enable a rim mounted tire to be received therebetween. The jaw faces are positioned so that at least one of these jaw faces is positioned adjacent the tire bead to be broken when the rim-mounted tire is received between the jaws. The second jaw member is positioned with respect to the first jaw member, the frame arms and the lever bar means so that, in operation, with the jaw faces positioned adjacent and bearing against the tire bead on at least one side of the tire, movement of the frame arms in one direction causes the jaw face of the second jaw member to move towards the jaw face of the first jaw member to cause breaking of the bead of the tire.

In a preferred embodiment of the present invention the first apex of the second jaw member is secured to the first frame arm at a point which is a similar distance from the pivot point of the two arms as the point on the second frame arm at which the lever bar means is pivotably secured. As well the side of the triangle between the first and second apexes is similar to the length of the lever bar.

The device in accordance with the present invention is inexpensive to manufacture and extremely easy to operate. It requires no external source of pressure such as an air compressor or hydraulic pump. The jaw faces may be readily adjusted so as to be used on different tires of different cross-sectional dimension. Because of the leverage advantage gained on the second jaw member because of the particular construction of this device, sufficient power is generated to enable the breaking of beads of pneumatic tire casings of very large cross-sectional diameters.

BRIEF DESCRIPTION OF THE DRAWINGS

These and other objects and advantages of the invention will become apparent upon reading the following detailed description and upon referring to the drawings in which.

Figure 3:
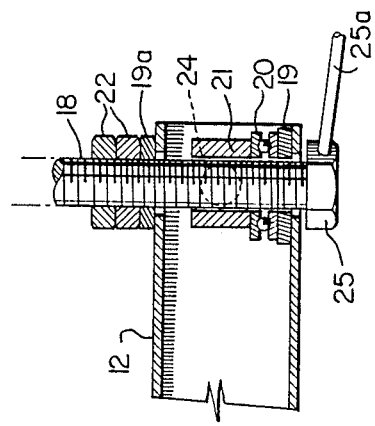
FIG. 3 on the first page of drawings is an enlarged partial side view in partial section of a lower portion of the device of FIGS. 1 and 2.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 1:
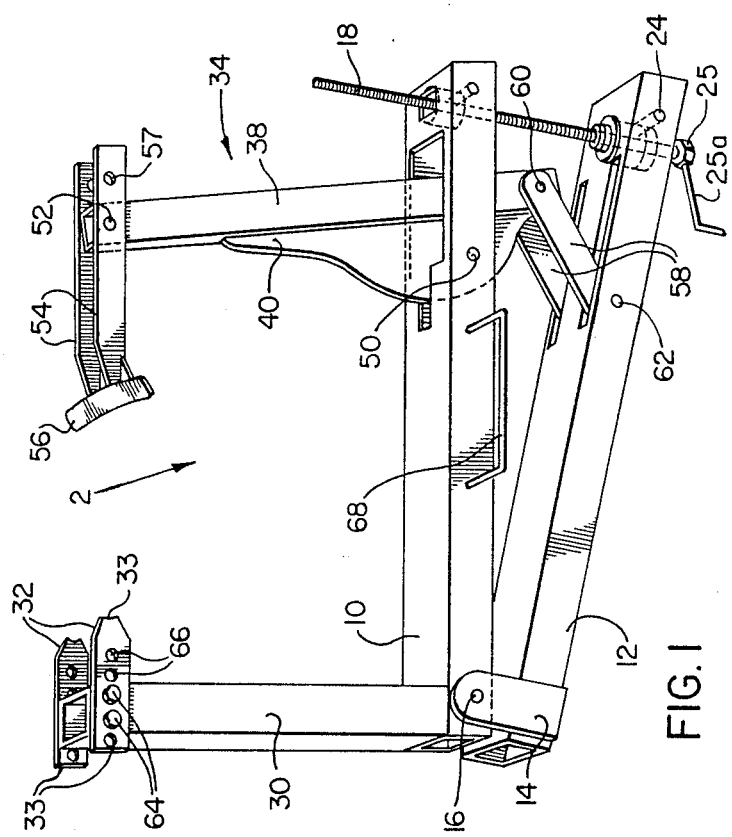
FIG. 1 is a perspective view of a mechanical bead breaking device in accordance with the present invention.
Figure 2:
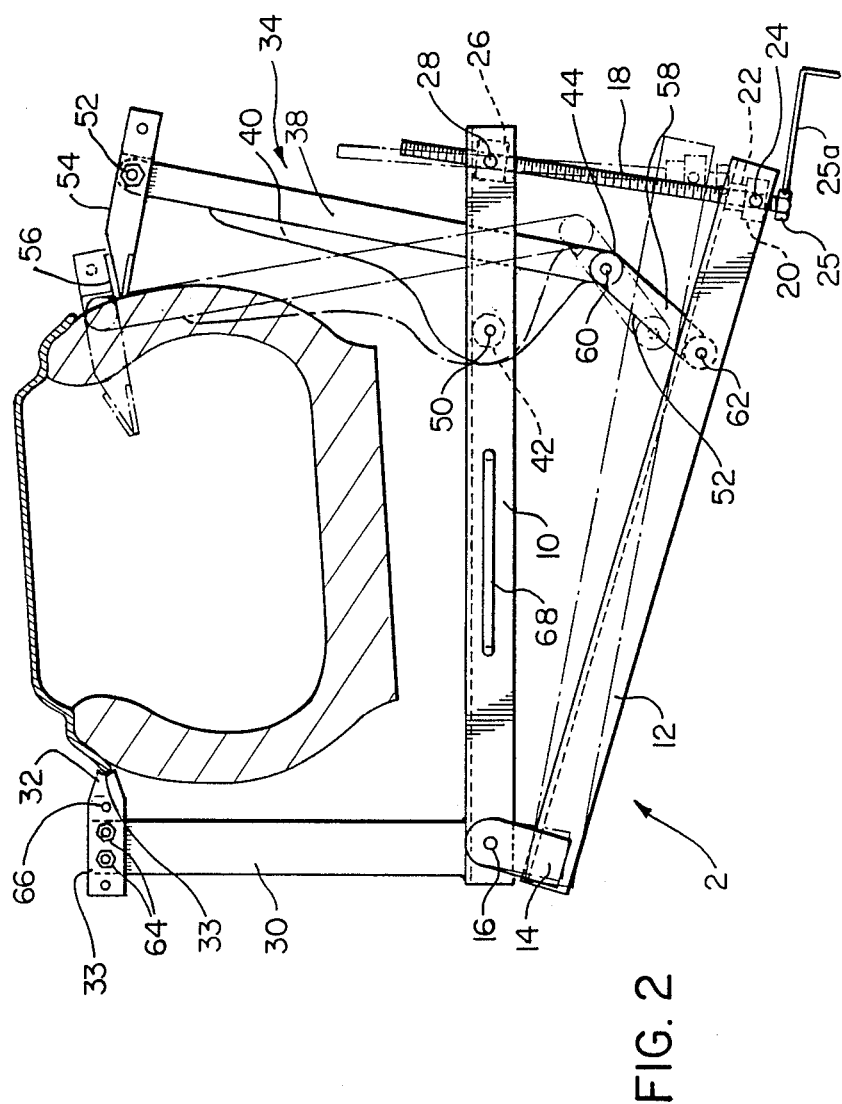
FIG. 2 is a side view of the device of FIG. 1 with a tire and rim schematically shown in section in position therein.

Turning to the drawings, in FIGS. 1 and 2 there is illustrated a mechanical device 2 in accordance with the present invention for breaking or loosening the bead 4 on a pneumatic tire 6 which is normally secured on a wheel rim 8 (FIG. 2), to facilitate removal of the tire from that rim. Device 2 comprises a first, upper elongated frame arm 10 which is preferably of rectangular tubular construction as illustrated. It co-operates with a second, lower elongated frame arm 12 of similar construction. These two arms are pivotably secured together at one end by means of a pair of ears 14, these ears being secured to lower frame 12 and supporting a pivot 16 which passes through one end of first frame arm 10 as illustrated.

At the other ends of arms 10 and 12 is a threaded bolt 18 which extends between and is secured to these two arms. At second frame arm 12, threaded bolt 18 passes through a washer 19, thrust bearing 20, pivot block 21 and jam nuts 22 as illustrated. A further washer 19a is provided between jam nuts 22 and the upper surface of lower arm 12 through which bolt 18 passes. Clearance holes are provided in washers 19 and 19a, as well as in thrust bearing 20 and pivot block 21 so that the threads of bolt 18 do not engage these elements. Pivot block 21, made of round bar stock and drilled to accommodate bolt 18, is secured to the sides of lower frame arm 12 by means of a pair of pivot pins 24 which project from the sides of pivot block 21 into corresponding drilled holes in the sides of frame arm 12. Bolt 18 is provided with an appropriate head 25 to which handle 25a is secured to permit manual turning of the bolt. Pivot block 21 permits proper alignment of bolt 18 with respect to lower frame arm 12 as the arms open and close with respect to pivot 16 as bolt 18 is turned, as will be described in more detail hereinafter.

Bolt 18 passes through threaded nut 26, made of round bar stock and threaded to accommodate bolt 18, which nut is pivotably secured to frame arm 10 by means of pivot pins 28 which project out of nut 26 into corresponding drilled holes in the sides of frame arm 10.

Thus, rotation of bolt 18 in one direction will cause gradual closing of arms 10 and 12 with respect to pivot 16; turning of bolt 18 in the opposite direction will cause the corresponding opening of these frame arms. In closing, turning of bolt 18 by movement of handle 25a and associated head 25 causes bolt 18 to progressively increasingly pass through threaded nut 26, drawing the arms closer together. Pivot pins 24 and 28 permit proper orientation respectively of nut 26 and pivot block 21 with respect to bolt 18 as these arms close. When bolt 18 is rotated in the opposite direction, as bolt 18 is gradually withdrawn through nut 26, jam nuts 22 and associated washer 19a rest against the upper surface of lower arm 12 causing the corresponding ends of arms 10 and 12 to spread further apart. Again, pivot pins 24 and 28 permit proper orientation of pivot block 21 and nut 26, with respect to bolt 18, as the arms are being opened.

Supported on and rigidly secured to upper frame arm 10 near its pivot end is a first jaw member 30. As can be seen, jaw member 30 extends in upstanding fashion, normal to frame arm 10, in a direction away from frame arm 12. At the upper end of jaw member 30 is a jaw face 32. Jaw face 32 is laterally adjustable with respect to jaw member 30 by appropriate positioning of bars 33 to which jaw face 32 is secured as will be described in more detail hereinafter. Slot 29 is provided in jaw face 32 for gripping, during operation, a portion of the edge of the rim of the tire as illustrated (FIG. 2).

Spaced from jaw member 30 and positioned near the other end of frame arm 10 is a lever arm forming second jaw member 34. Jaw member 34 consists of a lever bar 38, made of rectangular tubing, to which is welded a curved piece 40 of steel plate as illustrated. Lever bar 38 and steel plate 40 generally take the form of a triangle with three apexes 42, 44 and 46. This second jaw member 34 is pivotably secured to frame arm 10 by means of pivot pin 50 (at apex 42) through plate 40. At the upper ends of bar 38 is apex 46. As well, bars 54 to support a curved jaw face 56 are pivotably secured to lever bar 38 at apex 46 by means of bolt 52. The range of angles however through which jaw face 56 pivots with respect to lever bar 38, is restricted as required for effective action in meeting a variety of sizes of tires to force the bead from the tire by means of stop pin 57 secured to bars 54, at a position on the opposite side of lever arm 38 from jaw face 56. Jaw face 56 faces jaw face 32 and is curved to match the rim radius and the face of the tire side wall. These jaw faces and jaw members 30 and 34 are spaced a sufficient distance for receiving therebetween the appropriate portion of the tire and rim for the bead breaking operation (FIG. 2).

At apex 44, the lower end of bar 38 is secured together and pivotably secured to a pair of link bars 58 by means of pivot pin 60. The other ends of link bars 58 are pivotably secured to lower frame arm 12 by means of pivot pin 62. Link bars 58 are each about the same length as the distance between pivot pins 50 and 60. As well, pivot pin 62 for link bars 58 and pivot pin 50 at apex 42 are positioned about the same distance from pivot pin 16. Thus, it will be understood, when bolt 18 is turned to close or open frame arms 10 and 12, there will be a scissors-like action between link bars 58 and the line joining pivot pins 50 and 60, so that apex 44 will be moved in a direction towards or away from pivot pin 16. In the embodiment illustrated, apex 44 is positioned on the side of a line joining pivot pins 50 and 62 remote from pivot pins 16, so that rotation of bolt 18 to close arms 10 and 12 will cause lever 58 and the line joining pivot pins 50 and 60 to move to decrease the angle between them and apex 44 to move outwardly away from pivot pin 16. As can be seen in phantom in FIG. 2, this will cause counter-clockwise rotation of jaw member 34 about apex 42 and pivot pin 50, causing jaw face 56 to approach jaw face 32. When it bears against a portion of tire 6 or wheel rim 8, sufficient force is applied because of the leverage advantage achieved through this arrangement to force a portion of tire bead from its rim 8. Rotation of bolt 18 in the opposite direction will of course cause jaw member 34 to pivot about apex 42 and pivot 50 in the opposite direction, causing jaw face 56 to become more distant from jaw face 32.

In the illustrated embodiment jaw face 32 may be adjusted by removing bolts 64, sliding bars 33 to the position desired, and reinserting bolts 64 through the corresponding pre-drilled holes 66. This adjustment and the pivoting of jaw face 56 permit the device to be utilized on tires varying considerably in cross-sectional dimensions.

A handle 68 for carrying the device is also provided as illustrated.

Because of the construction in question, the device may be of relatively lightweight construction. It requires no hydraulic fluid pressure or compressed air pressure to operate, thereby enhancing its portability. It may be taken to the site of required repairs, whether that be at a service station, private residence, workshop area, roadside, or on the job in fields, construction areas and the like.

It will be readily understood that the device in accordance with the present invention is comprised of a minimum of working parts, is inexpensive to manufacture and very easy to operate. Despite the fact that no external source of pressure such as an air compressor or hydraulic pump is required, nevertheless the device in accordance with the present invention generates sufficient power to be used to break the beads of pneumatic tire casings of large cross-sectional diameters.

Thus it is apparent that there has been provided in accordance with the invention a mechanical device for loosening the bead of a pneumatic tire that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A mechanical device for breaking the bead of a pneumatic tire on a wheel rim to facilitate removal of the tire from that rim, the device comprising:
   (a) first and second rigid frame arms pivotally connected to each other at one end to pivot about a point;
   (b) an elongated screw means extending between and secured to the other ends of the frame arms, threadably secured to at least one of these ends so that rotation of the screw means in one direction causes the corresponding ends of the frame arms to spread and the frame arms to thereby open and rotation of the screw means in the other direction causes these ends of the frame arms to approach each other and the frame arms to thereby close;
   (c) a first jaw member rigidly secured to the first frame arm near the end of that frame arm which is pivotally connected to the other frame arm, and oriented in upstanding fashion in a direction away from the second frame arm, said first jaw member having at its upper free end a jaw face;
   (d) a lever bar means, one end of which is pivotally secured to the second frame arm at a point spaced a distance from the pivot point of the two arms;
   (e) a lever arm forming a second jaw member on which are three points in the form of the apexes of a triangle, the second jaw member being pivotally secured to the first frame arm at a first one of the apexes at a location spaced from the first jaw member, this second jaw member being pivotally secured to the other end of the lever bar means at a second one of the apexes located between the two frame arms, and a third one of the apexes located above the first frame arm in a direction away from the second frame arm and to which apex is secured a jaw face spaced from and facing the jaw face of the first jaw member, the first and second jaw members and associated jaw faces being spaced sufficiently to enable a rim mounted tire to be received therebetween, and the jaw faces positioned so that at least one of these jaw faces is positioned adjacent the tire bead to be broken when the rim-mounted tire is received between the jaws; the second jaw member positioned with respect to the first jaw member, the frame arms and the lever bar means so that, in operation, with the jaw faces positioned adjacent and bearing against the tire bead on at least one side of the tire, movement of the frame arms in one direction causes the jaw face of the second jaw member to move towards the jaw face of the first jaw member to cause breaking of the bead of the tire.

2. A device according to claim 1 wherein the lever arm forming the second jaw member comprises a bar to which is secured, on one side, a plate, the first apex being on the plate and the second and third apexes being on the bar.

3. A device according to claim 1 wherein the first apex of the second jaw member is secured to the first frame arm at a point which is a similar distance from the pivot point of the two arms as the point on the second frame arm at which the lever bar means is pivotally secured.

4. A device according to claim 3 wherein the side of the triangle between the first and second apexes is similar to the length of the lever bar means.

5. A device according to claim 4 wherein the second apex of the second jaw member is pivotably secured to the lever bar means at a position remote from the pivot point of the frame arms so that closing movement of the frame arms causes the second jaw member to pivot about the first apex towards the first jaw member.

6. A device according to claim 1 wherein the elongated screw means is an elongated threaded bolt rotatably secured to one of the frame arms and threaded through a nut secured to the other frame arm, the nut being provided with pivot means for pivotal movement of the nut for alignment of the nut with the bolt during opening or closing of the frame arms.

7. A device according to claim 1 wherein at least one of the jaw faces is provided with adjustment means for adjustable positioning of that jaw face towards or away from the other jaw face.

8. A device according to claim 1 wherein the jaw face of the second jaw member is pivotally secured to the second jaw member, to pivot within a restricted range of angles with respect to the second jaw member for effective action of the jaw face in meeting a variety of sizes of tires to break the tire bead during operation of the device.

* * * * *